United States Patent
Oka et al.

[11] Patent Number: 6,141,025

[45] Date of Patent: *Oct. 31, 2000

[54] IMAGE GENERATING APPARATUS WITH FIFO MEMORY AND CACHE MEMORY

[75] Inventors: Masaaki Oka, Kanagawa; Toshiyuki Hiroi, Tokyo, both of Japan

[73] Assignee: Sony Computer Entertainment, Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/930,588

[22] PCT Filed: Feb. 6, 1997

[86] PCT No.: PCT/JP97/00296

§ 371 Date: Feb. 2, 1998

§ 102(e) Date: Feb. 2, 1998

[87] PCT Pub. No.: WO97/29456

PCT Pub. Date: Aug. 14, 1997

[30] Foreign Application Priority Data

Feb. 6, 1996 [JP] Japan .................................. 8-020331

[51] Int. Cl.[7] .................................................. G06F 13/16
[52] U.S. Cl. ........................................... 345/521; 345/511
[58] Field of Search ..................... 345/418–432, 345/501–509, 511, 513, 515, 520, 521, 197, 203; 711/3, 117, 118

[56] References Cited

U.S. PATENT DOCUMENTS

| | | | |
|---|---|---|---|
| 5,448,264 | 9/1995 | Pinedo et al. | 345/508 |
| 5,572,657 | 11/1996 | Pinedo et al. | 345/506 |
| 5,574,847 | 11/1996 | Eckart et al. | 345/505 |
| 5,586,234 | 12/1996 | Sakuraba et al. | 345/430 |
| 5,673,422 | 9/1997 | Kawai et al. . | |
| 5,808,617 | 9/1998 | Kenworthy et al. | 345/421 |

FOREIGN PATENT DOCUMENTS

| | | |
|---|---|---|
| 19501560 A1 | 7/1995 | Germany . |
| 4-312187 | 11/1992 | Japan . |
| 5-143741 | 6/1993 | Japan . |
| 05091342 | 9/1993 | Japan . |
| 6-274410 | 9/1994 | Japan . |
| 7-249116 | 9/1995 | Japan . |

*Primary Examiner*—Ulka J. Chauhan
*Attorney, Agent, or Firm*—Fulwider Patton Lee & Utecht LLP

[57] ABSTRACT

Data from a main part of a drawing engine 101 is sent to and transiently stored in a first-in-first-out (FIFO) memory 102 for storage transiently therein and is supplied via an operating device 103 to a fast cache memory 104 where data exchange is carried out with a frame buffer 105. A cache controller 106 controls the cache memory 104 for pre-reading the contents of the FIFO memory 102 and collectively reading/writing data of the same page in the frame buffer 105 which is accessible at a high speed. This enables fast accessing using an inexpensive frame buffer to improve the drawing speed.

5 Claims, 14 Drawing Sheets

IMAGE GENERATING APPARATUS WITH FIFO MEMORY AND CACHE MEMORY

BACKGROUND OF THE INVENTION

1. Field of the Invention

This invention relates to an image generating apparatus and, more particularly, to an image generating apparatus used in a video equipment employing a computer, such as a graphics computer, a special effect device or a video game machine.

2. Related Art

In an equipment employing computer graphics, such as a video game machine, a personal computer or a graphics computer, geometry processing or rendering processing is carried out for generating data of a picture or an image outputted to and displayed on a television receiver, a monitor receiver or a cathode ray tube (CRT) display device. A geometry processing unit performs coordinate transformation, clipping or light source calculations, while a rendering processing unit takes account of colors and Z-values of all pixels making up a polygon, from the color data of apex points and Z-values indicating the depth, for writing pixel data in an image memory.

For performing such processing, in particular the above-mentioned rendering processing, a drawing processing circuit or a drawing engine is used. The drawing engine generally employs a method of writing a generated pixel directly in an image memory.

Meanwhile, the image drawing speed is influenced by the speed of writing from the drawing engine to the image memory, such that, with a slow image memory accessing speed, the drawing speed is lowered. Therefore, if an expensive high-speed memory is used as a large-capacity image memory for increasing the drawing speed, the system cost is prohibitively increased. However, if an inexpensive dynamic random access memory (DRAM) is used, the drawing speed of the system is lowered.

It may be envisaged to provide a buffer memory corresponding to a DRAM page between the drawing engine and the image memory, and to make image memory accessing only for high-speed burst transfer. However, if drawing data occurs in a sequence of bridging the page boundary within the range of the buffer memory capacity, the lowered efficiency results.

In view of the foregoing, the present invention provides an image generating apparatus whereby a high drawing speed may be maintained even with the use of an inexpensive memory, such as a DRAM.

SUMMARY OF THE INVENTION

The present invention provides a picture generating apparatus for generating pixel data for picture display responsive to the picture information by drawing processing means and for writing generated pixels on a picture memory corresponding to a display screen, including a memory for transient storage of data from the drawing processing means, a cache memory provided between the memory and the picture memory and cache controlling means for controlling read/write for the cache memory responsive to the contents of the memory.

In the picture generating apparatus of the present invention, the cache controlling means collectively loads data in the same page of the picture memory responsive to the contents of the memory.

In the picture generating apparatus of the present invention, an operating device is provided between the memory and the cache memory for carrying out operations responsive to an output of the drawing processing means.

In the picture generating apparatus of the present invention, the memory is a FIFO memory.

In the picture generating apparatus of the present invention, the picture memory is a frame memory.

In the picture generating apparatus of the present invention, the operating device performs Z-buffer processing responsive to an output of the drawing processing means.

In the picture generating apparatus of the present invention, the operating device performs anti-aliasing processing responsive to an output of the drawing processing means.

In the picture generating apparatus of the present invention, the operating device performs filtering processing responsive to an output of the drawing processing means.

In the picture generating apparatus of the present invention, the operating device performs α-blending responsive to an output of the drawing processing means.

In the picture generating apparatus of the present invention, the operating device performs semi-transparent processing responsive to an output of the drawing processing means.

In the picture generating apparatus of the present invention, the operating device performs pixel re-arraying processing responsive to an output of the drawing processing means.

With the picture generating apparatus according to the present invention, picture data generated by drawing processing means, such as drawing engine, is transiently stored in a memory, such as FIFO memory. A fast cache memory is provided between this FIFO memory and a frame buffer and the contents of the FIFO memory are pre-read by cache control means for controlling read/write for the cache memory. Therefore, if an inexpensive memory such as a usual DRAM is used as a frame buffer, high-speed accessing is realized via the cache memory for improving the drawing efficiency. At this time, data for one page of the frame buffer can be collectively read and written with high efficiency for realizing faster accessing. An operating device is provided between the FIFO memory and the cache memory for carrying out Z-buffer processing, anti-aliasing, various filtering operations, α-blending processing, semi-transparent processing or pixel-re-arraying processing.

BRIEF DESCRIPTION THE DRAWINGS

DETAILED DESCRIPTION OF THE PREFERRED EMBODIMENTS

Figure 1:
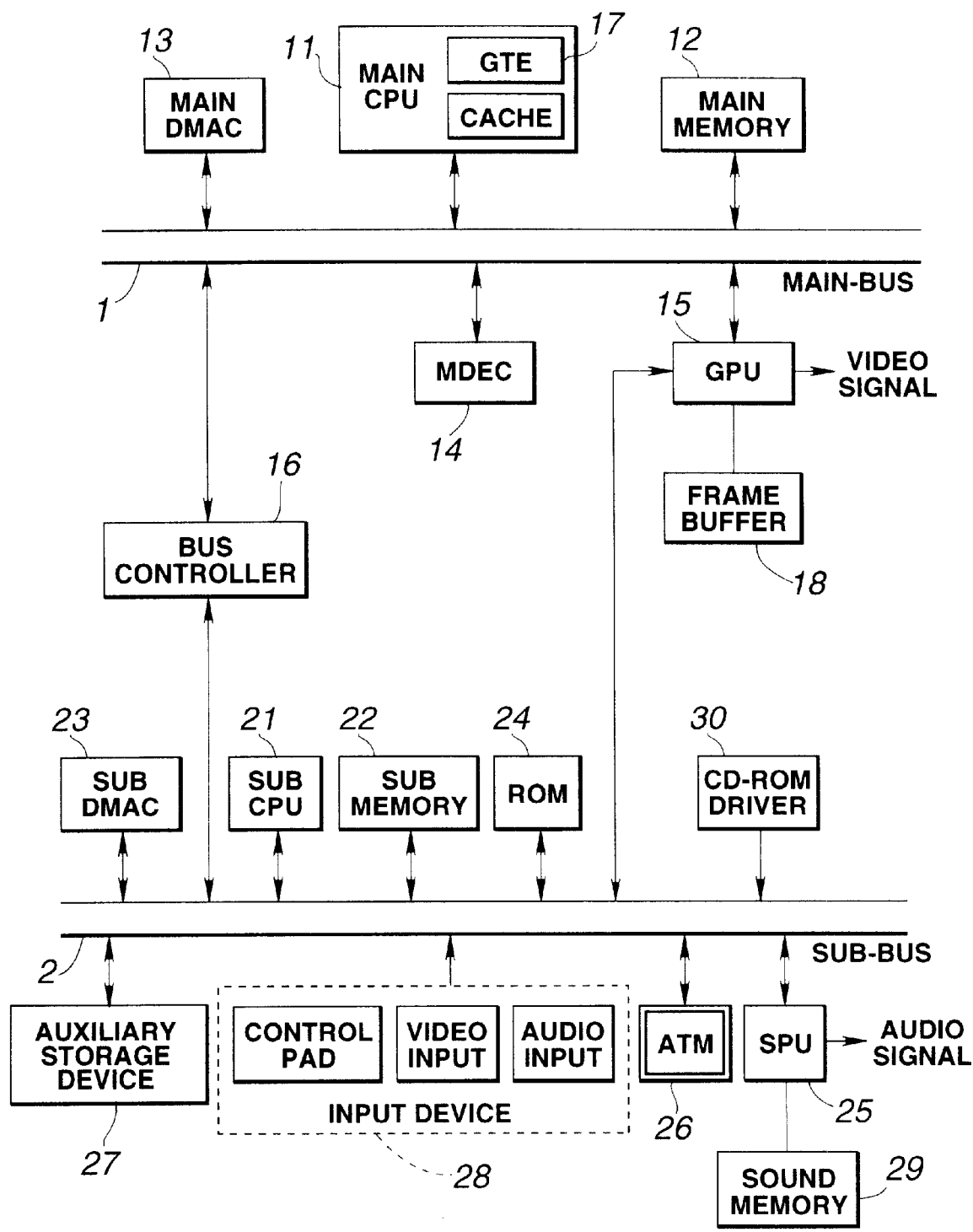
FIG. 1 is a block diagram showing a schematic structure of an embodiment of the present invention in which an image generating apparatus is applied to a video game machine.

Referring to the drawings, preferred embodiments of the present invention will be explained in detail. FIG. 1 shows a schematic structure of a video game machine as an image generating apparatus according to the present invention.

The video game machine shown in FIG. 1 reads out and executes a game program stored in an auxiliary storage device, such as an optical disc, for performing a game in accordance with instructions from a user.

Specifically, this video game machine has two sorts of buses, namely a main bus 1 and a sub-bus 2. The main bus 1 and the sub-bus 2 are interconnected via a bus controller 16.

To the main bus 1 are connected a central processing unit (CPU) 11, made up of a micro-processor, a main memory 12, formed by a random access memory (RAM), a main dynamic memory access controller or main DMAC 13, a MPEG decoder 14 and a picture processing unit or graphic processing unit (GPU) 15. To the sub-bus 2 are connected a subsidiary central processing unit or sub-CPU 21, made up of a micro-processor, a subsidiary memory, formed by a random access memory (RAM), a subsidiary dynamic memory accessing controller or sub DMAC 23, a read-only memory (ROM) 24, having stored therein a program, such as an operating system, a sound processing unit (SPU) 25, a communication controller or asynchronous transmission mode (ATM) 26, an auxiliary storage device 27, an input device 28 and a CD-ROM driver 30.

The bus controller 16 is a device on the main bus 1 for switching between the main bus 1 and the sub-bus 2, and is opened in an initial state.

The main CPU 11 is a device on the main bus 1 operating by a program on the main memory 12. Since the bus controller 16 is open on start-up, the main CPU 11 reads in a boot program from the ROM 24 on the sub-bus 2 in order to load an application program and necessary data from the CD-ROM by the CD-ROM driver 30 on the main memory 12 or on the devices on the sub-bus 2. On the main CPU 11 is loaded a geometry transfer engine (GTE) 17 for performing processing such as coordinate transformation. This GTE 17 has a parallel computing mechanism for carrying out plural computing processing operations in parallel and is responsive to a request for computing processing from the CPU 11 in order to carry out fast processing operations, such as coordinate transformation, light source calculations, matrix or vector operations. Based on the results of computing processing operations by the GTE 17, the main CPU 11 defines a three-dimensional model as a combination of basic unit figures, such as triangles or quadrangles, formulates a drawing command associated with each polygon for drawing a three-dimensional picture and packetizes the drawing command in order to route the resulting command packet to the GPU 15.

The main DMAC 13 is a device on the main bus 1 for performing control such as DMA transfer on the devices on the main bus 1. If the bus controller 16 is open, the main DMAC 13 also controls the devices on the sub-bus 2.

The GPU 15 is a device on the main bus 1 functioning as a rendering processor. This GPU 15 construes the drawing command sent from the main CPU 11 or main DMAC 13 as command packet and performs rendering processing of writing pixel data in the frame buffer 18 as an image memory, from color data and depth of the pixels, taking into account the colors and Z-values of all pixels making up the polygon.

The MDEC 14 is an I/O connection device operable in parallel with the CPU and is a device on the main bus 1 functioning as a picture expansion engine. The MDEC 14 decodes picture data compressed and encoded by orthogonal transform, such as discrete cosine transform. The sub-CPU 21 is a device on the sub-bus 2 operating in accordance with a program on the sub-memory 22.

The sub-DMAC 23 is a device on the sub-bus 2 for performing control such as DMAC transfer for devices on the sub-bus 2. This sub-DMAC 23 can acquire bus rights only when the bus controller 16 is closed.

The SPU 25 is a device on the sub-bus 2 functioning as a sound processor. This SPU 25 is responsive to a sound command sent as a command packet from the sub-CPU 21 or sub-DMAC 23 as a command packet to read out sound source data from the sound memory 29 to output the read-out data.

The ATM 26 is a communication device on the sub-bus 2.

The auxiliary storage device 27 is a data input/output device on the sub-bus 2 and is made up of a non-volatile memory, such as a flash memory. This auxiliary storage device 27 temporarily holds on memory data such as game progress or scores.

The input device 28 is an inputting device from other equipments, such as a control pad on the sub-bus 2, man-machine interface, such as a mouse, picture input or speech input.

The CD-ROM driver 30 is a data input device on the sub-bus 2 and reproduces an application program and necessary data from the CD-ROM.

That is, in the above-described video game machine, the geometry processing system, executing geometry processing, such as coordinate transformation, clipping or light source calculations, formulating a drawing command for defining a three-dimensional model as combination of basic unit figures (polygons) such as triangles or quadrangles for drawing a three-dimensional picture, and sending out the drawing command associated with each polygon as command packet to the main bus 1, is made up of the main CPU 11 and the GTE 17 on the main bus 1. Also, the rendering processing system for formulating pixel data of each polygon based on the drawing command from the geometry processing system for writing in the frame buffer 18 by way of rendering processing for drawing a figure in the frame buffer 18 is constituted by the GPU 15.

Figure 2:
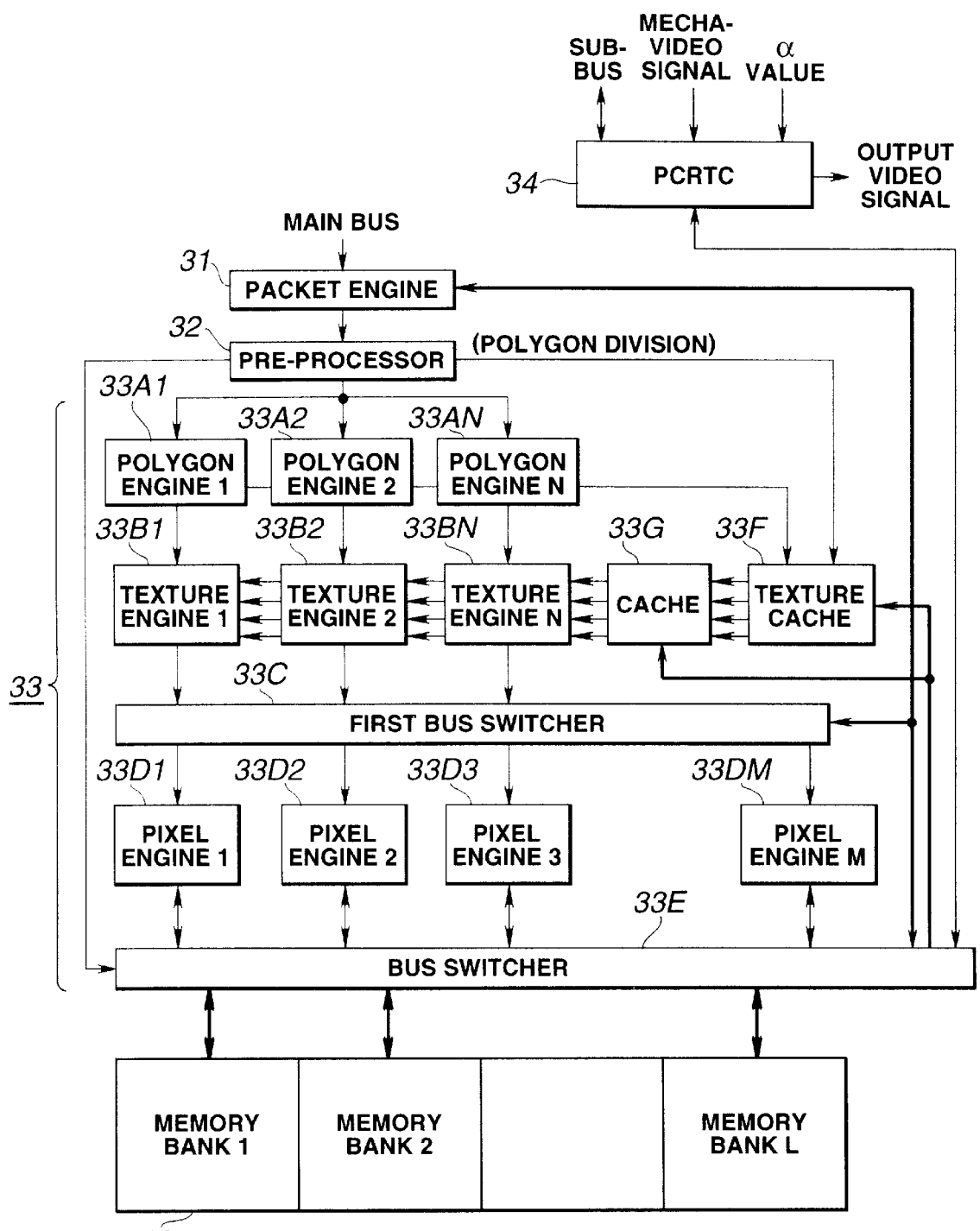
FIG. 2 is a block diagram showing an illustrative structure of a graphics processor which is an image processing device of an image generating apparatus according to the present invention.

Referring to FIG. 2, showing a detailed structure of the GPU 15, the GPU includes a packet engine 31 connected to the main bus 1 and performs rendering processing of writing pixel data of each polygon in the frame buffer 18 by the pre-processor 32 and the drawing engine 33 in accordance with the drawing command sent as a command packet from the main CPU 11 or main DMAC over the main bus 1 to the packet engine 31, reading out pixel data of the picture drawn in the frame buffer 18 and furnishing the read-out pixel data via CRT controller 34 as video signals to a television receiver or a monitor receiver, not shown.

The packet engine 31 develops the command packet sent from the main CPU 11 or main DMAC 13 over the main bus 1 on a register, not shown.

The pre-processor 32 generates polygon data in accordance with the drawing command sent to the packet engine 31 as command packet and performs pre-set pre-processing, such as polygon division as later explained, on the polygon data, while generating various data such as apex point coordinate information for the respective polygons required by the drawing engine 33, address information such as texture or MIP map texture, or control information, such as pixel interleaving.

The drawing engine 33 includes N polygon engines 33A1, 33A2, . . . , 33AN, connected to the pre-processor 32, N texture engines 33B1, 33B2, . . . , 33BN, connected to the polygon engines 33A1, 33A2, . . . , 33AN, respectively, a first bus switcher 33C, connected to the texture engines 33B1, 33B2, . . . , 33BN, M pixel engines 33D1, 33D2, . . . , 33DM, connected to the first bus switcher 33C, a second bus switcher 33E, connected to the pixel engines 33D1, 33D2, . . . , 33DM, a texture cache 33F connected to the second bus switcher 33E, and a CLUT cache 33G connected to the texture cache 33F.

In the drawing engine 33, the N polygon engines 33A1, 33A2, . . . , 33AN sequentially generate polygons in accordance with the drawing command on the basis of the polygon data pre-processed by the pre-processor 32 for performing parallel shading processing from one polygon to another.

The N texture engines 33B1, 33B2, . . . , 33BN perform texture mapping or MIP map processing in parallel, based on the texture data supplied from the texture cache 33F via color lookup table (CLUT) cache 33G, on the polygons generated by the polygon engines 33A1, 33A2, . . . , 33AN.

The pre-processor 32 previously furnishes the address information, such as texture or MIP map texture, bonded to the polygons processed by the N texture engines 33B1, 33B2, . . . , 33BN, to the texture cache 33F. Based on the above address information, the necessary texture data is transferred from the texture area on the frame buffer 18. To the CLUT cache 33G, CLUT data to be referred to during texture drawing is transferred from the CLUT area on the frame buffer 18.

The polygon data, processed with texture mapping or MIP map processing by the N texture engines 33B1, 33B2, . . . , 33BN, are transferred via first bus switcher 33C to M pixel engines 33D1, 33D2, . . . , 33DM.

The M pixel engines 33D1, 33D2, . . . , 33DM perform various picture processing operations, such as Z-buffer processing or anti-aliasing processing, in parallel, for generating M pixel data.

The M pixel data, generated by the M pixel engines 33D1, 33D2, . . . , 33DM, are written in the frame buffer 18 via second bus switcher 33E.

The second bus switcher 33E is fed with the pixel interleaving control information from the pre-processor 32. The second bus switcher 33E has a function of performing pixel interleaving processing of selecting L pixel data from the M pixel data generated by the M pixel engines 33D1, 33D2, . . . , 33DM in accordance with the above control information for writing M pixel data using the M storage locations conforming to the shape of the polygon drawn on the frame buffer 18 as accessing unit.

The drawing engine 33 generates and writes all pixel data of each polygon in the frame buffer 18, based on the polygon data pre-processed by the pre-processor 32, for drawing a picture defined as the combination of the polygons by the drawing command on the frame buffer 18. The pixel data of the picture drawn on the frame buffer 18 is read out and furnished via CRTC 34 as video signals to a television receiver or to a monitor receiver, not shown.

Figure 3:
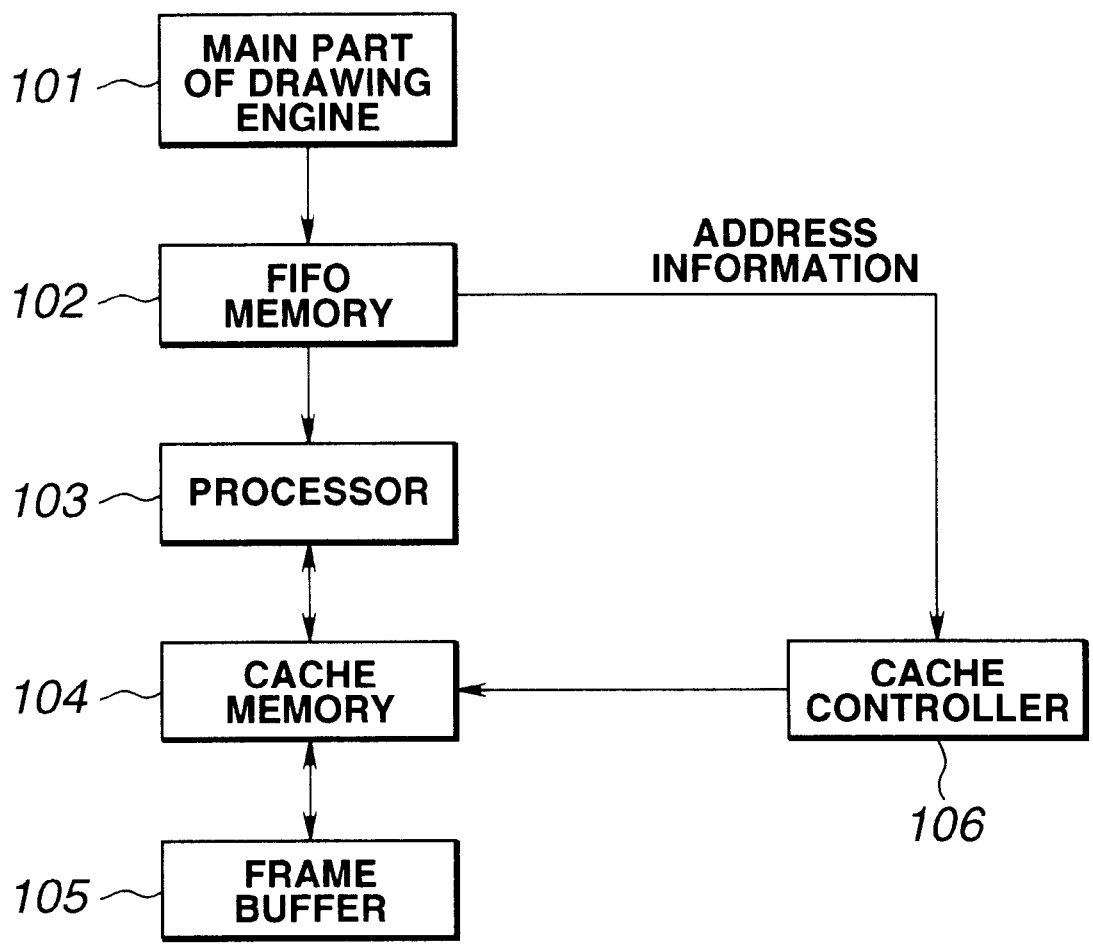
FIG. 3 is a block diagram showing an illustrative structure between the main portion of a drawing engine and a frame buffer of the image generating apparatus according to the present invention.

Referring to FIG. 3, an illustrative structure between the main portion of a drawing engine 33 and a frame buffer 18 is explained.

In FIG. 3, a main portion 101 of the drawing engine 33 corresponds to a structure upstream of the pixel engines 33D1, 33D2, . . . , 33DM shown in FIG. 2. Each of the pixel engines 33D1, 33D2, . . . , 33DM includes a first-in first-out (FIFO) memory 102, an operating device 103, a cache memory 104 and a cache controller 106 shown in FIG. 3. The main portion 101 of the drawing engine outputs pixel data to be drawn and sends the pixel data to the FIFO memory 102 for transient storage therein. This FIFO memory 102 can pre-read the memory contents as later explained and has pre-reading controlled by the cache controller 106.

Figure 4:
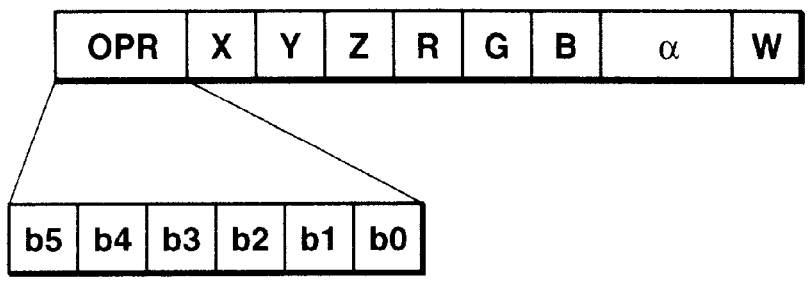
FIG. 4 illustrates an example of a data structure in a FIFO memory.

In the FIFO memory 102 are written data or commands configured as shown for example in FIG. 4, in which OPR denotes an operation code, X, Y and Z denote coordinate values, R, G and B and a denote color values and W denotes a write enable flag. The operation code OPR is made up of, for example, six bits b0 to b5, of which the bit b0 denotes whether or not α-blending is made with 1 and 0, while the bit b2 denotes whether or not a Z-buffer is used by 1 and 0. The bits b2 and b3 denote multiplication factors in the longitudinal and transverse directions, respectively, with 0 and 1 denoting factors of 1 and 2, respectively. If b2 is 1, two longitudinal pixels are drawn as two longitudinal pixels, with Y being a multiplication factor of 2. If b3 is 1, two transverse pixels are drawn as two transverse pixels, with X being a multiplication factor of 2. The bits b5 and b4 are used for selecting filtering or anti-aliasing. If the bits b5 and b4 are 00, 01, 10 or 11, direct drawing, anti-aliasing, filtering of type 1 and filtering of type 2, are carried out, respectively.

The operating device 103 of FIG. 3 is comprised of a comparator or an effector, as later explained, and reads out pixels from the FIFO memory 102 to carry out operations or comparison of the Z-value required of the pixels. Moreover, the operating device 103 performs writing, Z-buffer processing, blending, semi-transparent processing, anti-aliasing, various filtering and pixel re-arraying operations. The cache memory 104 is provided for burst transfer with the frame buffer 105 of the next stage employing an inexpensive memory, such as an ordinary random access memory (DRAM).

Figure 5:
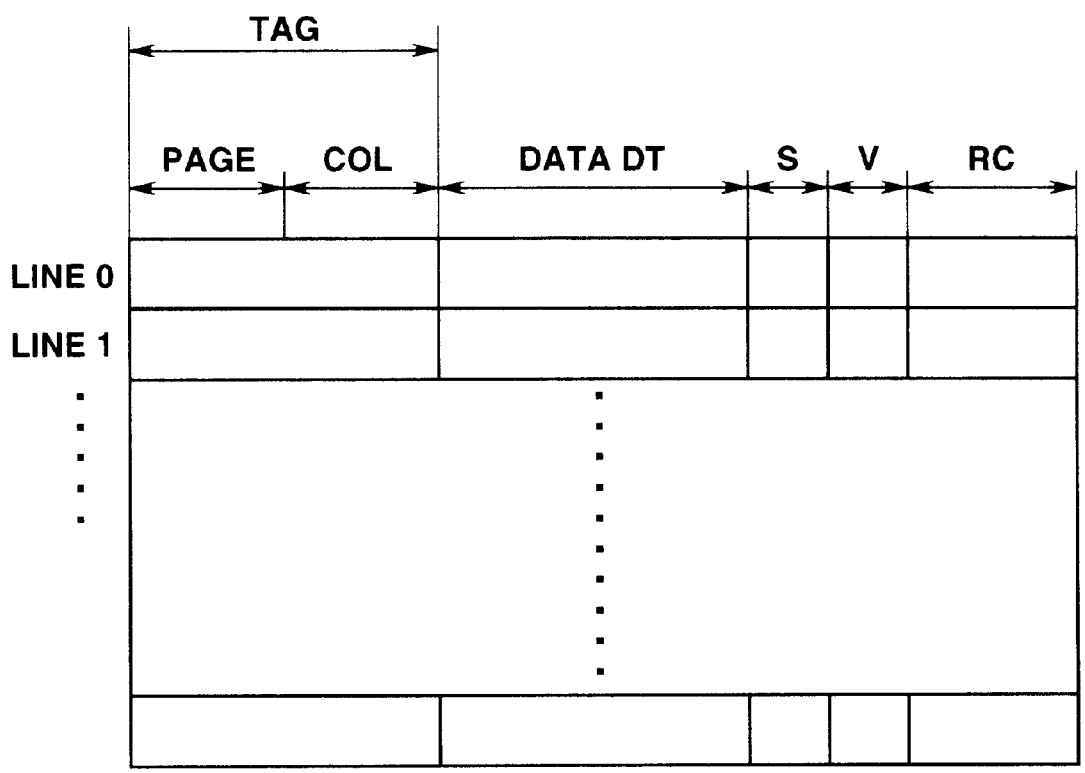
FIG. 5 illustrates an example of a data structure in a cache memory.

An illustrative data structure in the cache memory is shown in FIG. 5, in which Tag is a tag area or a tag field comprised of a page address page and a column address col, DT is a data area, S and V are flag areas indicating whether or not the tag and data are valid and RC is a request count area indicating a count value of the data access request. The frame buffer 105 is equivalent to the frame buffer 18 of FIGS. 1 and 2. This one row is termed one line with the cache memory 104 usually having a memory capacity of two or more lines. Generally, the page address page and the column address col of the tag area denote the row address and the column address or upper order address of the frame buffer 105, respectively.

The cache controller 106 is control means for controlling the cache memory 104. The cache controller 106 issues instructions to previously check the contents of the FIFO memory 102 to comprehend the required data area. If there is a sufficient vacant area in the cache memory 104, the cache controller issues instructions to re-arrange the sequence in which the data area appears and to collectively access the same page in the same frame buffer 105, such as DRAM. The cache controller 106 also issues instructions to transfer data collectively from the cache controller 104 to the frame buffer 105 so that the word boundary or the page boundary of the DRAM is not traversed and so that the number of times of accessing and the accessing time will be short. The operation of the cache controller 106 will be explained subsequently.

With the above-described picture generating device, the drawing efficiency by the drawing engine can be improved, while the Z-buffering, anti-aliasing, various filtering operations, α-blending, semi-transparent processing or pixel re-arraying processing can be carried out efficiently.

Before proceeding to more specified illustration of the above embodiment, the pertinent technique and a reference example of writing pixel data in the frame buffer by the drawing engine is explained.

When the drawing engine has direct access to the frame buffer, the drawing speed is determined by the frame buffer accessing speed, thus requiring an expensive high-speed large-capacity memory. If an inexpensive usual DRAM is used as a frame buffer, the drawing rate is retarded, as explained previously.

Figure 6:
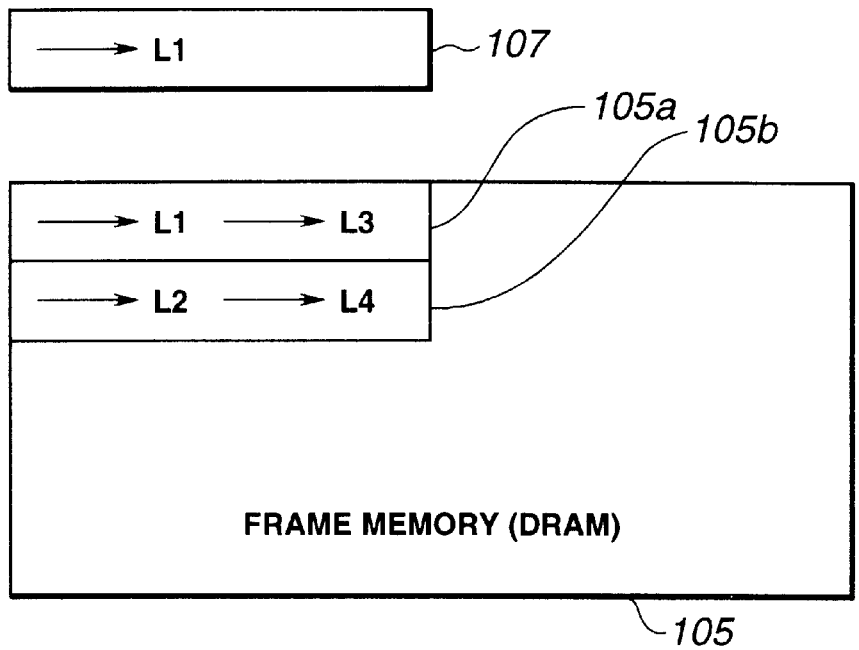
FIG. 6 illustrates the operation in case a buffer memory is provided between the drawing engine and the frame buffer.

It is assumed that a buffer memory capable of high-speed burst transfer is provided between the drawing engine and the frame buffer. For example, it is assumed that a buffer memory 107 having a capacity corresponding to one row of the frame buffer 105, that is one page, of FIG. 6, and drawing data strings L1, L2, L3 and L4 are sequentially drawn by the drawing engine. In this case, the drawing data strings L1, L3 and the drawing data strings L2, L4 are drawn in the areas 105a, 105b of the frame buffer 105, respectively.

Before the drawing engine writes the drawing data string L1 in the buffer memory 107, data of the area 105a of the frame buffer 105 are read, that is loaded, into the buffer memory 107 by burst transfer. When next the drawing data string L2 is drawn, the contents of the buffer memory 107 are written by burst transfer into the area 105a and data of the area 105b of the frame buffer 105 is read (loaded) into the buffer memory 107. The drawing data string L2 is then written in the buffer memory 107. When next the drawing data string L3 is drawn, the contents of the buffer memory 107 are written into the area 105b of the frame buffer 105 and subsequently the contents of the area 105a are read by burst transfer into the frame buffer 107 for writing the drawing data string L3 at a position next following the drawing data string L1. When next the drawing data string L4 is drawn, the drawing data strings L1, L3 in the frame buffer 107 are written in the area 105a of the frame buffer 105. The contents of the area 105b are then written in the frame buffer 107 and the drawing data string L4 is written at a position next following the drawing data string L2.

In the structure employing the buffer memory 107, since the accessing by the frame buffer occurs frequently, the effect of high speed accessing by burst transfer occasionally cannot be displayed sufficiently.

Figure 7:
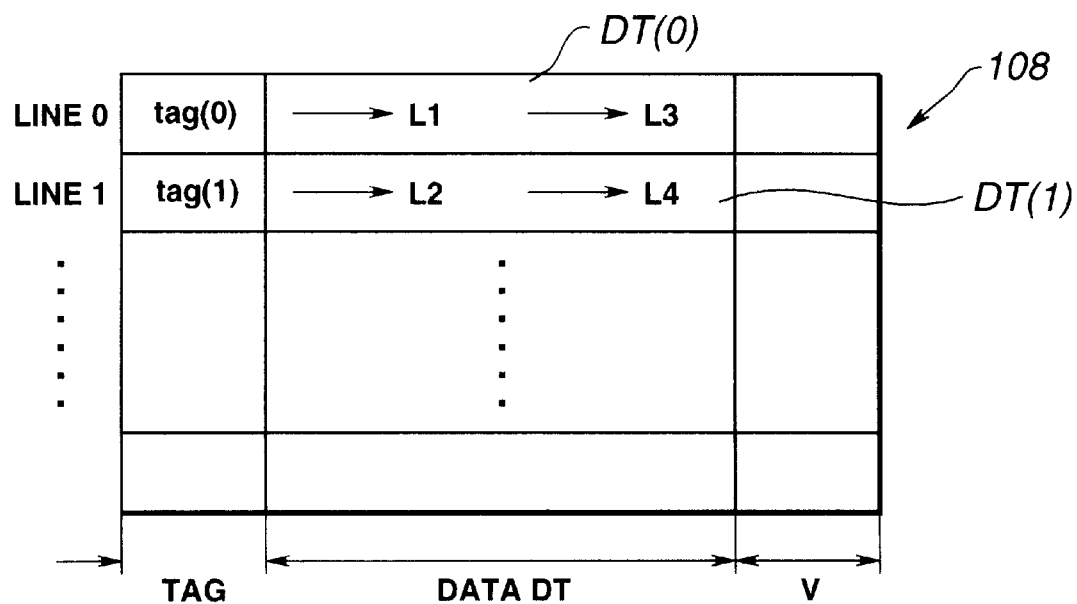
FIG. 7 illustrates a data structure in an ordinary cache memory.
Figure 8:
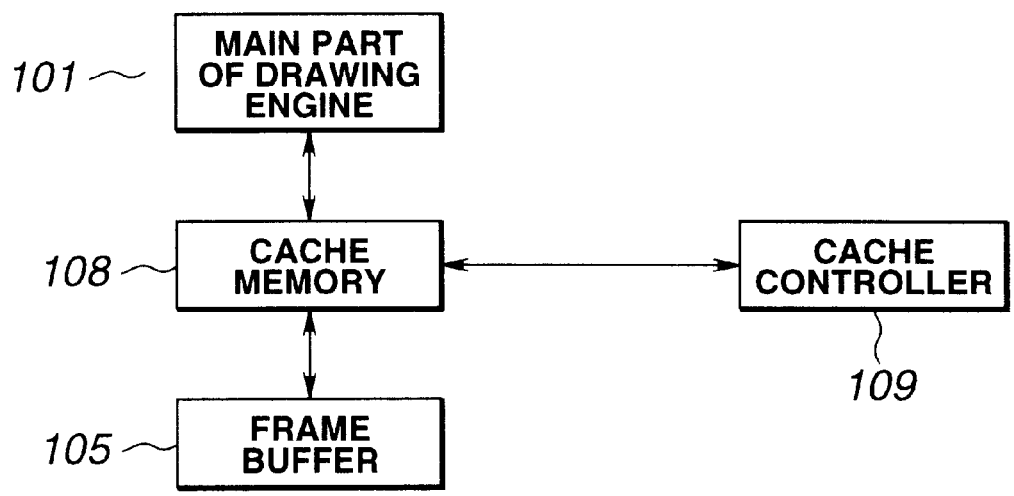
FIG. 8 is a block diagram showing a schematic structure in case a usual cache memory is provided between the main portion of the drawing engine and the frame buffer.

It is now proposed to provide the cache memory 108 configured as shown in FIG. 7 between the main portion of the drawing engine 101 and the frame buffer 105, as shown in FIG. 8. the cache memory 108 has its data read-write controlled by the cache controller 109. Although the memory structure of FIG. 7 is substantially similar to FIG. 5, it uses only a V (valid) flag as a usual cache memory structure.

If, with the use of such cache memory 108, the drawing data strings L1, L2, L3 and L4 are sequentially drawn by the drawing engine 101, data of the area 105a of the frame buffer 105 are read (loaded) as the contents of the data DT (0) of the cache memory 108, the drawing data strings L1, L3 are written for the data DT(0). Also, data of the area 105b of the frame buffer 105 are read as the contents of the data DT (1), and subsequently the drawing data strings L2, L4 are written. This enables collective reading/writing of the drawing data strings L2, L4 as data DT (0) in the area 105a of the frame buffer 105, while enabling collective reading/writing of the drawing data strings L2, L4 as the data DT (1) in the area 105b of the frame buffer 105, thus decreasing the number of times of accessing to the frame buffer 105 to assure high-speed drawing.

An illustrative example of the algorithm of the control operation by the cache controller 109 of FIG. 8 is explained with reference to FIG. 9.

Figure 9:
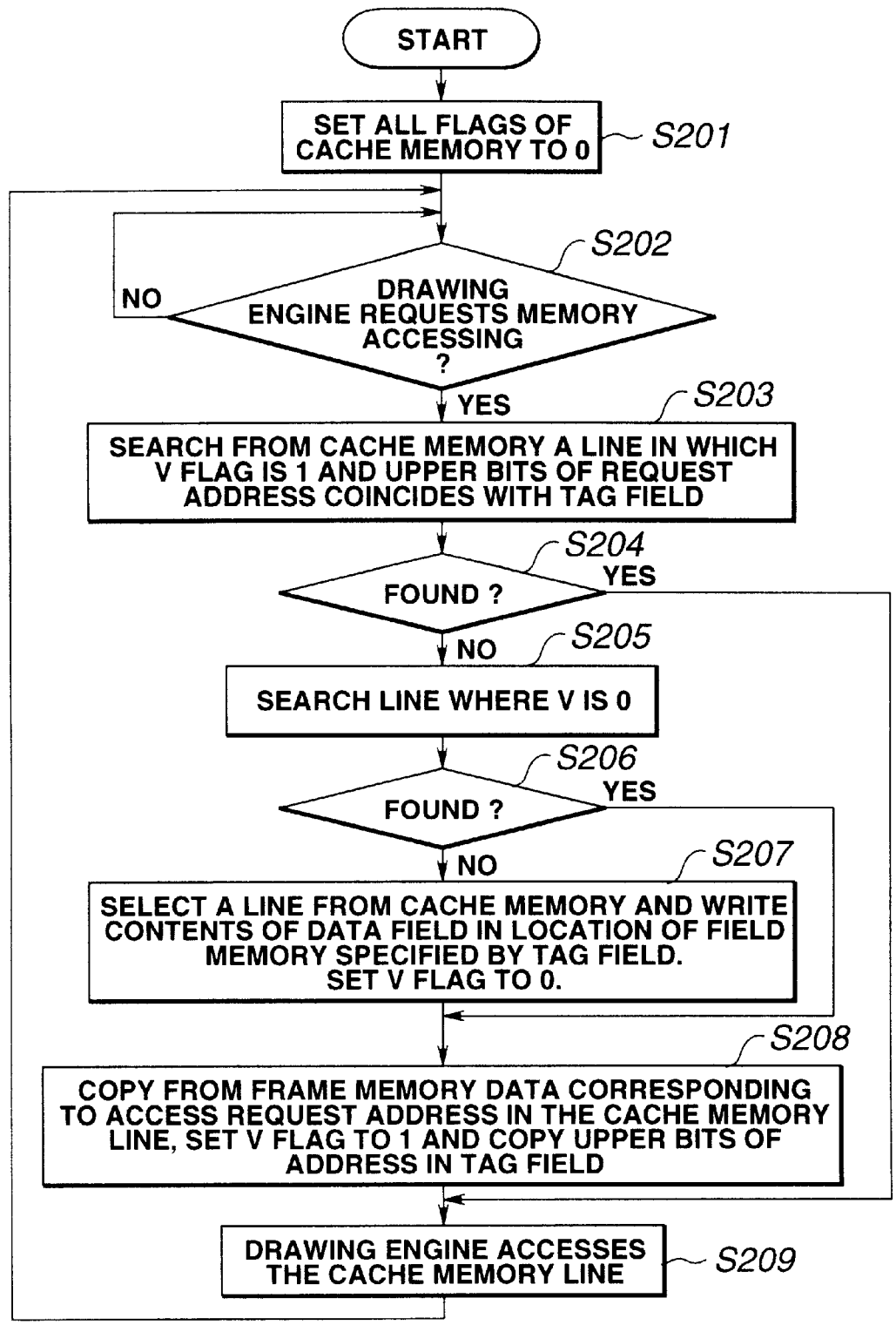
FIG. 9 is a flowchart for illustrating the operation of the structure shown in FIG. 8.

In FIG. 9, the V-flags of all lines of the cache memory 108 are set to 0 at the first step S201. Processing then transfers to step S202 to set up a stand-by state until the drawing engine requests a memory accessing. If memory accessing is requested, processing transfers to step S203 to search for one of all lines of the cache memory 108 in which the V-flag is 1 and the upper order bits of the request address coincide with the tag Tag. At the next step S204, it is checked whether or not such line has been found. If the result of check is NO, processing transfers to step S205 and, if otherwise, processing transfers to step S209. At step S205, a line with the V-flag of 0 is searched. If the result of check is NO, processing transfers to step S207 and, if otherwise, processing transfers to step S208. At the step S207, the line is selected from the cache memory 108 and the contents DT of the data area are written in the address position of the frame buffer indicated by the tag Tag. After setting the V-flag for the line, processing transfers to step S208. At step S208, for the line with the zero V-flag as found at step S206 or the line whose V-flag has been set to 0 at step S207, data corresponding to the address of the memory access request from the drawing engine 101 is copied from the frame buffer 105. The V-flag for the line is set to 1 and the upper order bits of the address are copied in the tag area for the line, after which processing transfers to step S209. At this step S209, the drawing engine 101 accesses the line of the cache memory 108, after which processing reverts to step S202.

In the embodiment explained with reference to FIGS. 7 to 9, accessing from the drawing engine 101 to the high-speed cache memory 108 is performed effectively, while the number of times of accessing operations to the frame buffer 105 is decreased thus enabling high-speed drawing.

If, in the above arrangement, the drawing data strings L1 to L4 corresponding to one line of the cache memory are drawn sequentially, page switching is required when writing the drawing data string L2 next to the drawing data string L1 for the frame buffer 105. Similarly, page switching is required when writing the drawing data strings L3 and L4 next to the drawing data strings L2 and L3, respectively. Thus a sum total of four page accessing operations, including the page switching for writing the first drawing data string L1, are required. In the frame buffer 105 employing the usual DRAM, it is known that, while high-speed data transfer can be achieved in the so-called high-speed page mode of continuous data reading/writing in the same page, accessing with page designation becomes time-consuming. Thus, for sequentially drawing the drawing data strings L1 to L4 shown in FIG. 10, four accessing operations with page designation are required, thus lowering the drawing speed.

In the embodiment shown in FIG. 3, the FIFO memory 102 is provided in addition to the cache memory 104. The contents of the FIFO memory 102 are pre-read by the cache controller 106 and the same page in the frame buffer 105 is accessed collectively for further improving the drawing speed.

Figure 11:
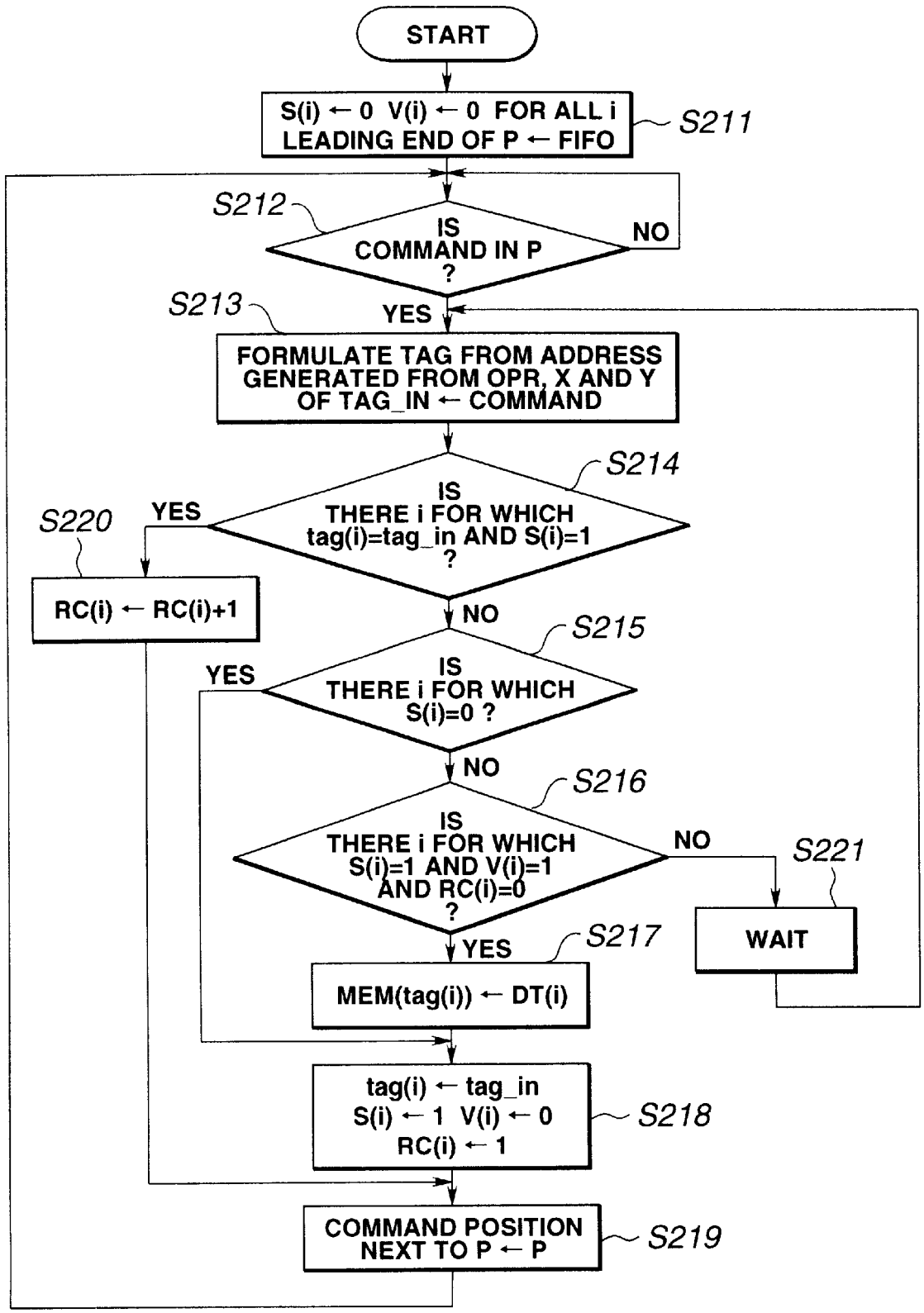
FIG. 11 is a flowchart for illustrating a first-read operation of the FIFO memory by a cache controller in the structure of FIG. 3.
Figure 12:
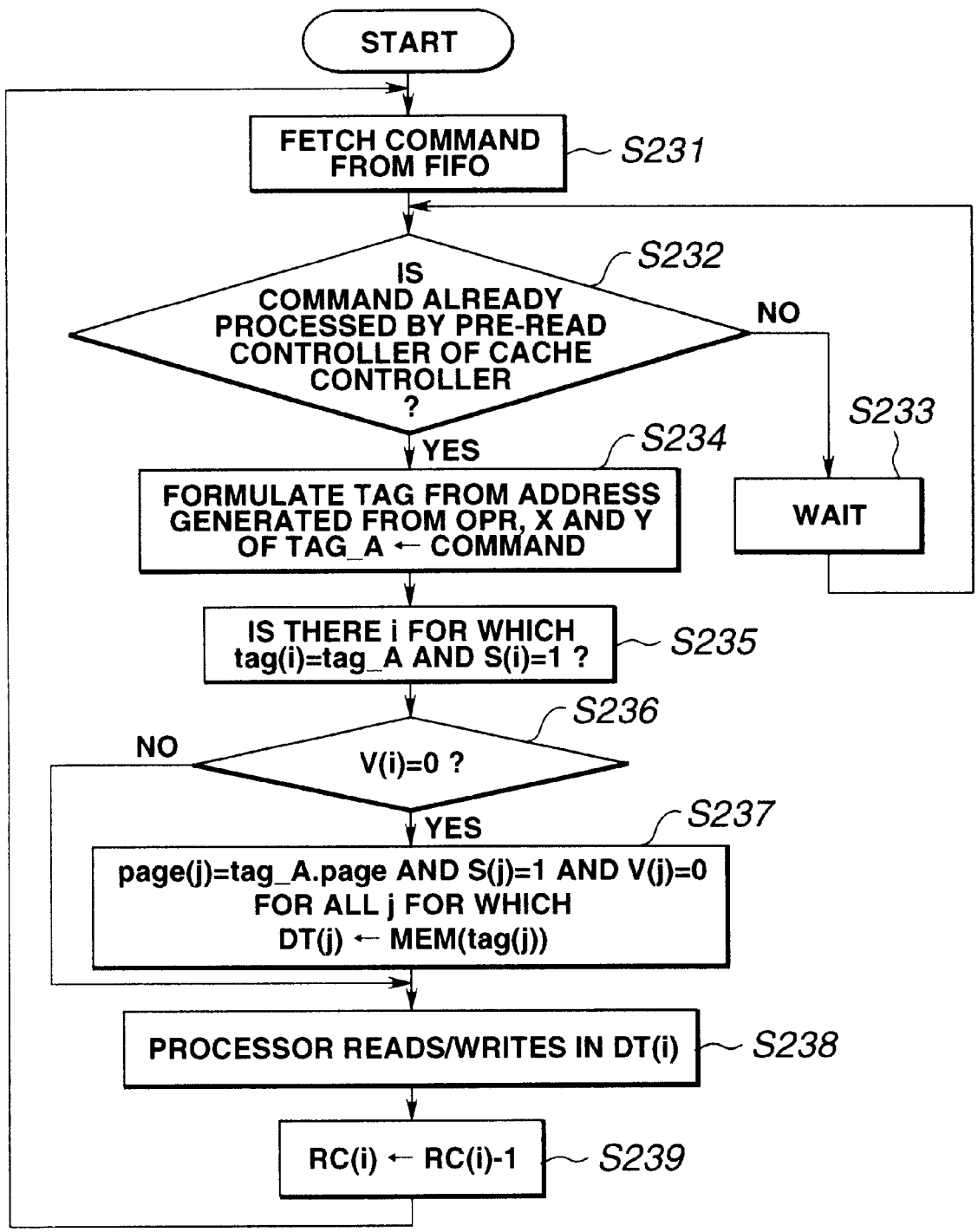
FIG. 12 is a flowchart for illustrating the read/write operation for the cache memory by the cache controller in the structure of FIG. 3.

An illustrative example of the algorithm for pre-reading control by the cache controller 106 is shown in FIG. 11, while an example of the read-write control for the cache memory 104 is shown in FIG. 12.

At the first step S211 of FIG. 11, the S-flags and the V-flags of all lines of the cache memory 104 are set to 0, while the pointer P indicating the command in the FIFO memory 102 is set to the leading position. In FIGS. 11 and 12, index variables specifying the lines of the cache memory 104 are set to i or j, while the contents of the S-flags and the V-flags of the line i are set to S(i) and V(i), respectively. At step S211, S(i) and V(i) are set to 0 for all values of i.

At the next step S212, it is checked whether or not a command has been written at a position of the pointer P of the FIFO memory 102. If the result of check is NO, processing reverts to step S212. If otherwise, processing transfers to step S213.

At the step S213, an address corresponding to the tag, for example, a page address and a column address, is generated and written, for a tag variable tag__in, from the address generated by the operation code OPR of the position command of the pointer P and the coordinates X and Y.

At the next step S214, it is checked for all values of i in the cache memory 104 whether the tag tag(i) is the contents of the tag variable tag__in and whether or not there is such i for which the S-flag S(i) is 1. This is tantamount to judging whether the data of the associated address is in the cache memory or whether or not there is any access-request-registered line for the same tag. If the result of check at step S214 is NO, processing transfers to step S215 and, if otherwise, processing transfers to step S220.

At step S215, it is checked whether or not there is such i for which the S-flag S(i) is 0. If the result of check is NO, processing transfers to step S216 and, if otherwise, processing transfers to step S218. This is tantamount to judging that the data is valid but already drawn and whether or not there is any line for which there is no request, that is whether or not there is any cache entry. If the result of check at step S216 is YES, processing transfers to step S217 and, if otherwise, processing transfers to step S221.

At step S217, the data DT(i) for the line of the above value of i is transferred to and written in memory contents MEM (tag(i)) for the address position specified by the tag tag(i) in the frame buffer 105.

At the next step S218, the tag variable tag__in is written in the tag(i) for the above line i in the cache memory 104. The S-flag S(i) and the V-flag V(i) are set to 1 and 0, respectively, while the request count RC(i) is set to 1. This is tantamount to new registration of the access request.

At the next step S219, the pointer P of the FIFO memory 102 is incremented to the next command position. Processing then reverts to the above step S212.

If the result of step S214 is YES, the line i of the cache memory 104 or the access request count RC(i) of the cache entry is incremented to (RC(i)+1) at step S220. Then, processing transfers to step S219.

If the result of step S214 is NO, there is no vacancy on the cache memory 104, so that processing is in stand-by (waiting) state at step S221 to await occurrence of the vacancy by processing by cache read-write control as later explained before reverting to step S213.

Then, in the read/write control of the cache memory 104 of FIG. 12, a command is fetched at the first step S231 from the FIFO memory 102. At the next step S232, it is checked whether or not the command has already been pre-read-processed in the cache controller 106 as explained with reference to FIG. 11. If the result of step S232 is NO, processing transfers to step S233 to wait for pre-read processing of FIG. 11 to revert to step S232. If the result of step S232 is YES, processing transfers to step S234.

At step S234, an address which becomes a tag, such as a page address and a column address, is generated from the address generated by the coordinates X, Y and the operation code OPR of the command read out from the FIFO memory 102, and is written in a tag variable tag__A.

At the next step S235, such value of i in the cache memory 104 which gives tag(i)=tag__A and S(i)=1 is searched. The line or the cache entry for such i is already pre-read and hence can be necessarily found.

At the next step S236, it is checked whether or not the V-flag V(i) is 0. If the result is YES, processing transfers to step S237, whereas, if otherwise, processing transfers to step S238. It is when the access request is made but the data is invalid that V(i) becomes equal to 0.

At step S237, such a line from all lines in the cache memory 104 for which, if an index variable is j, the page address (j) of the tag tag(j) is equal to the page address portion tag__A.page of the tag variable tag__A, the S-flag S(j) is 1 and the V flag V(j) is 0 is searched and the memory contents MEM(tag(j)) of the address position specified by the tag tag(i) in the frame buffer 105 for a data area of the lines of all values of j satisfying this condition are written as data DT(j). This is tantamount to reading (loading) all requested data in the same page in the frame buffer 105 at a high speed.

At the next step S238, the operating device 103 reads/writes data DT(i) of the line i of the cache memory 104.

At the next step S239, the access request count RC(i) is decremented (RC(i)−1) to revert to step S231.

Figure 10:
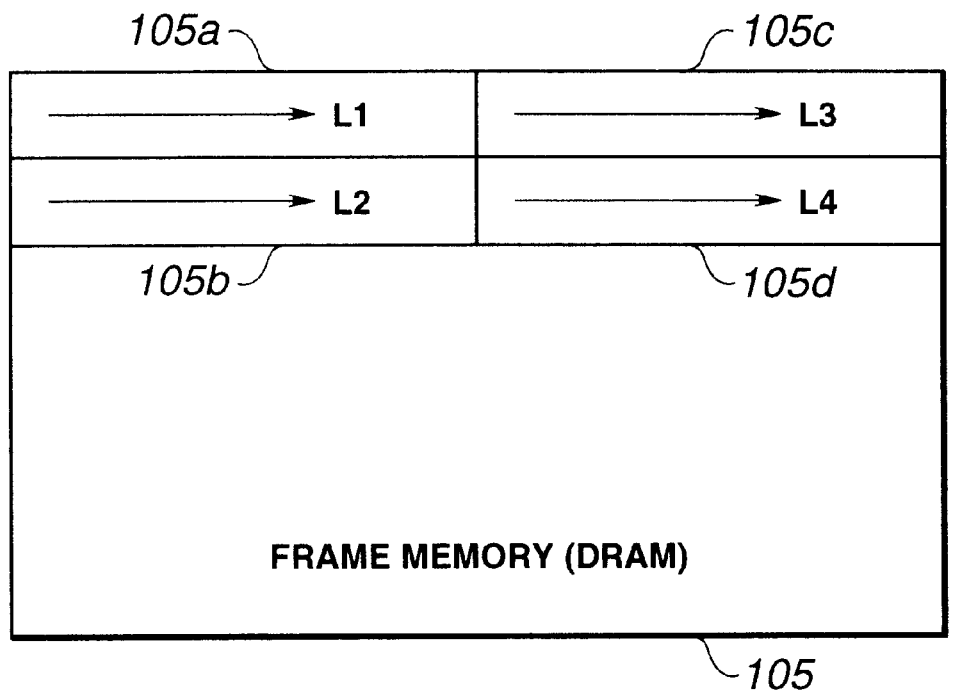
FIG. 10 illustrates the operation of writing a drawing data string in the frame buffer.

As described above, the cache controller 106 pre-reads the command in the FIFO memory 102 to group together data of the same page in the frame buffer 105 to load data in the cache memory 104 at high speed without page switching. For example, drawing data strings L1, L3 in the same page in FIG. 10 are grouped together, while drawing data strings L2, L4 are grouped together to carry out data transfer with the cache memory 104, so that page designation accessing needs to be performed only twice thus realizing accessing at higher speed than in the structure employing only the cache memory shown in FIG. 8 in need of four page designation accessing for raising the drawing speed.

Meanwhile, in the operating device 103 of FIG. 3, so-called buffer processing, anti-aliasing, various filter processing, α-blending, semi-transparent processing and pixel re-arraying processing are carried out responsive to a command received from the drawing engine. An illustrative example of the operating device 103 is explained with reference to FIG. 13.

In this figure, a command fetched from the main portion 101 of the drawing engine via FIFO memory 102 has a structure as shown with reference to FIG. 4. The coordinate data X is directly fed to a fixed contact a of a changeover switch 122 and to a fixed contact b thereof via a multiplier 123 with a multiplication factor of 2, while the coordinate data Y is directly fed to a fixed contact a of a changeover switch 124 and to a fixed contact b thereof via a multiplier 123 with a multiplication factor of 2. These changeover switches 122, 124 are switching-controlled by bits b3, b2 of an operation code OPR of the command. Output signals of the changeover switches 122, 124 are sent to the tag area of the cache memory 104 as X and Y coordinates as X- and Y-addresses on the frame buffer 105. The coordinate data Z of the command represents the distance along the depth form the viewing point and is sent to an input terminal A of a comparator 125. The other input terminal B of the comparator 125 is fed with a Z-value from the cache memory 104. These two input values are compared to each other to perform Z-buffer processing as hidden-surface processing. That is, a comparison result output of the comparator 125 is fed via a latch 126, an AND gate 127 and a fixed terminal a of a changeover switch 129 as a write control signal Write to the cache memory 104. This achieved control of writing a pixel having a Z-value corresponding to the proximal side in the cache memory 104. The control as to whether or not buffer processing should be made is carried out by changing over the changeover switch 129 by a bit b1 of the operation code OPR of the command, while the write timing is synchronized by taking out the control signal of FIG. 13 at a NOT gate 128 and sending the control signal thus taken out to the AND gate 127 and to the fixed contact b of the changeover switch 129.

Output data Data-out from the cache memory 104 is sent to the operating device 130 which is fed with color values R, G and B of the command and a coefficient a for α-blending and which is controlled by the operation code OPR of the command. An output of the operating device 130 is sent via a latch 131 as Data-in to the cache memory 104 via latch 131. The input data to the cache memory 104 is written in the frame buffer 105.

An illustrative structure of the operating device 130 is explained with reference to FIG. 14. Although the internal structure of a B-operating part 132B for R (red) data processing is shown in this figure, the G-operating part 132G for G (green) processing or the B-operating part 132B for B (blue) processing are similar in the internal structure and hence are not shown for simplicity.

Figure 13:
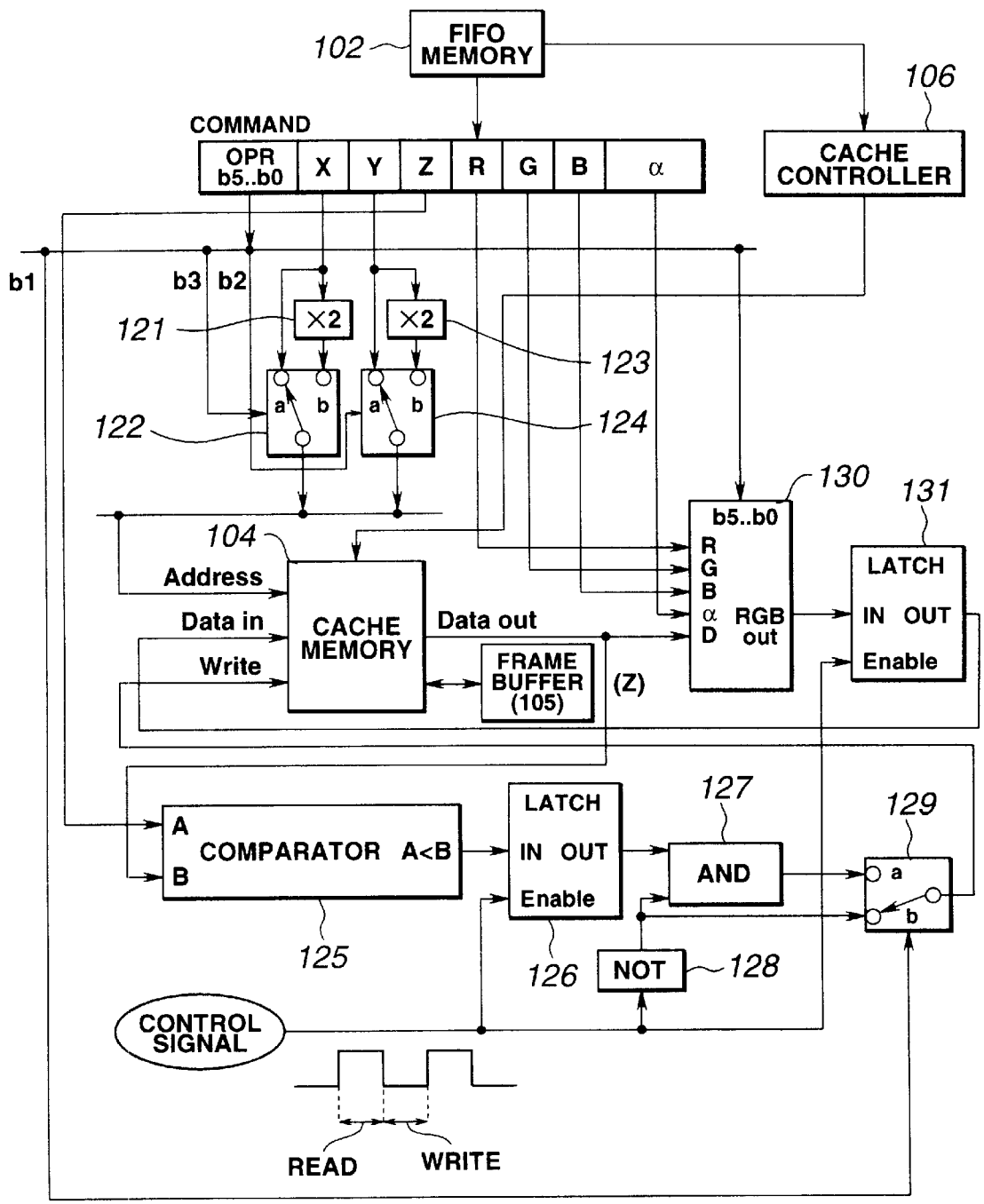
FIG. 13 is a block circuit diagram showing a specified example of an operating device of FIG. 3.
Figure 14:
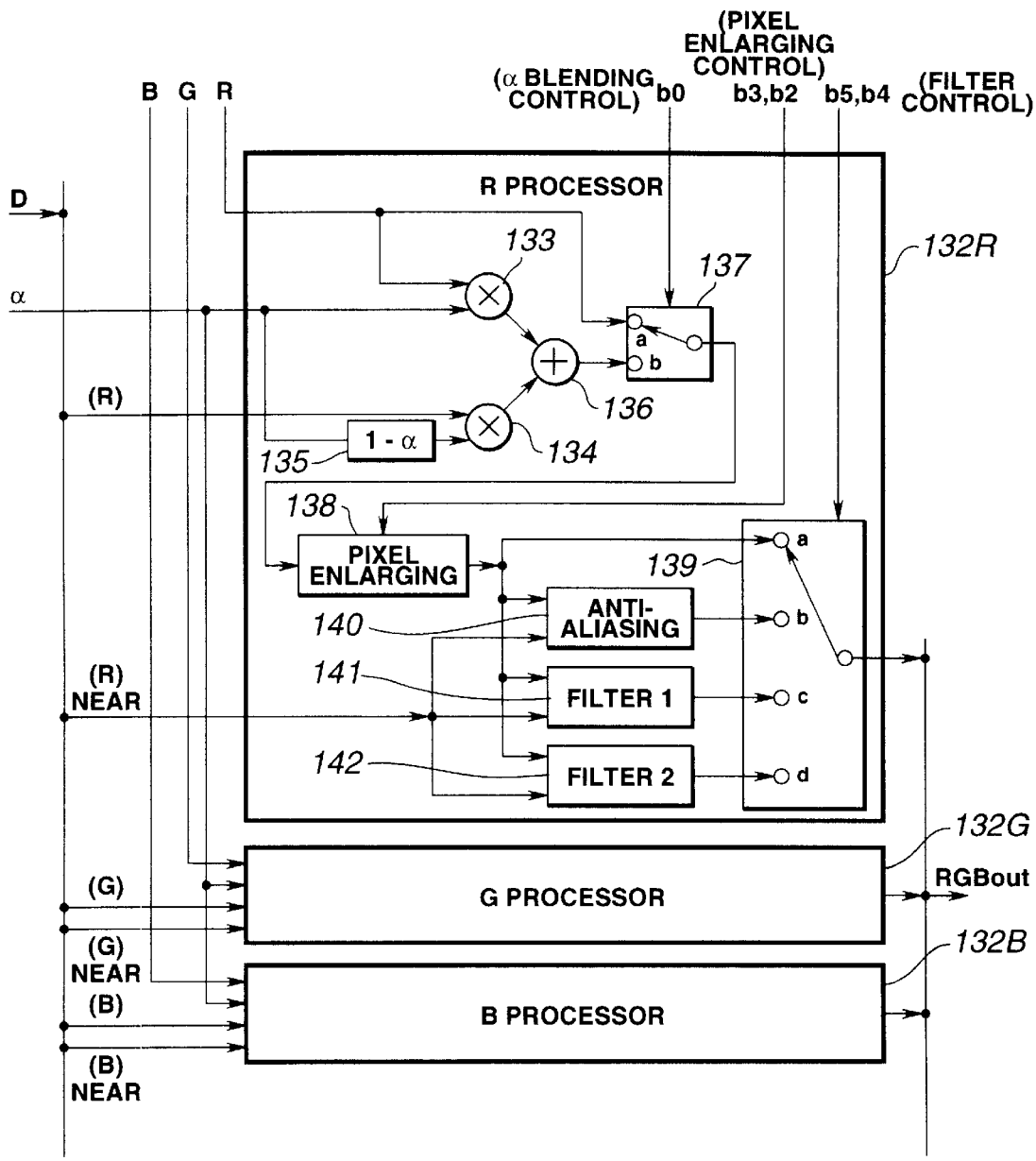
FIG. 14 is a circuit diagram showing the specified example of an operating device of FIG. 13.

The R-operating part 132R of FIG. 14 is fed with R-data of the command taken out from the FIFO memory 102 of FIG. 13, coefficient a and data component (r) of data output Data-out from the cache memory 104 and its neighborhood data, as data, while being fed with bit b0 and bits b2 to b5 of the operation code OPR of the command. The R-data of the command is fed to a multiplier 133 so as to be multiplied by the coefficient a, while the R data component of the data output Data-out is sent to a multiplier 134 where it is multiplied with (1-α) supplied from a subtractor 135. Outputs of the multipliers 133, 134 are sent to an adder 136 so as to be summed together. The resulting sum is sent to a fixed contact b of a changeover switch 137. The R-data component (R) of the command is supplied to a fixed contact a of the changeover switch 137. The changeover switch 137 is on-off controlled by the bit b0 of the operation code OPR for on-off controlling the α-blending processing. An output of the changeover switch 137 is sent to a pixel enlarging circuit 138 controlled by bits b3 and b2 of the operation code OPR. Outputs of the pixel enlarging circuit 138 are sent to a fixed contact a of a changeover switch 139, an anti-aliasing circuit 140, a type 1 filter circuit 141 and to a typ2 filter circuit 142. Outputs of the anti-aliasing circuit 140 and the filter circuits 141, 142 are sent ti fixed terminals b, c and d of the changeover switch 139. This changeover switch 139 is changeover-controlled by the bits b5, b4 of the operation code OPR. An output of the changeover switch 139 is taken out as output of the R-operating part 132B and sent to the latch 131 of the next stage, along with outputs of the G-operating part 132G and the B-operating part 132B, as output of the operating part 131 of FIG. 13.

Figure 15:
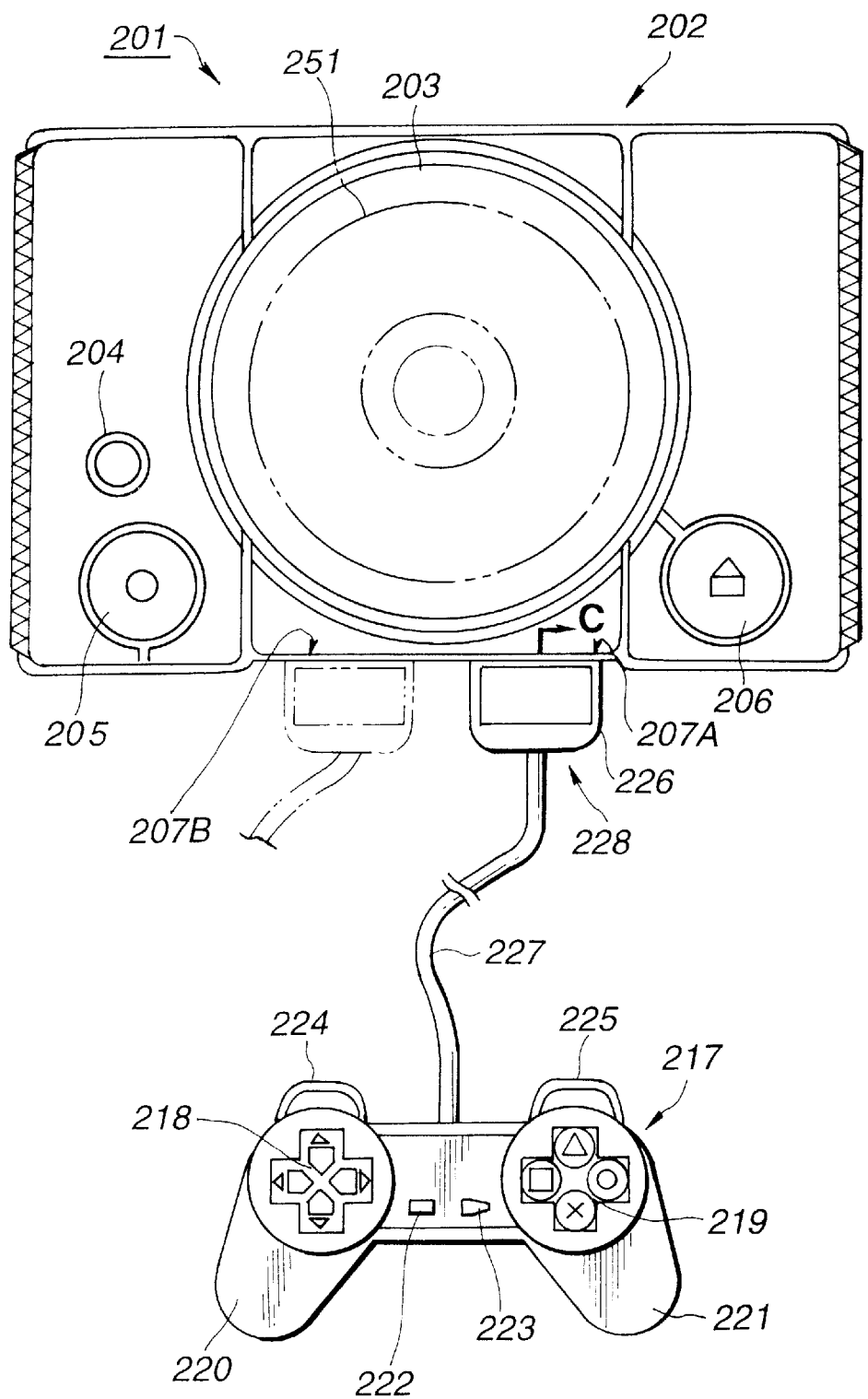
FIG. 15 is a plan view of a video game machine embodying the present invention.
Figure 16:
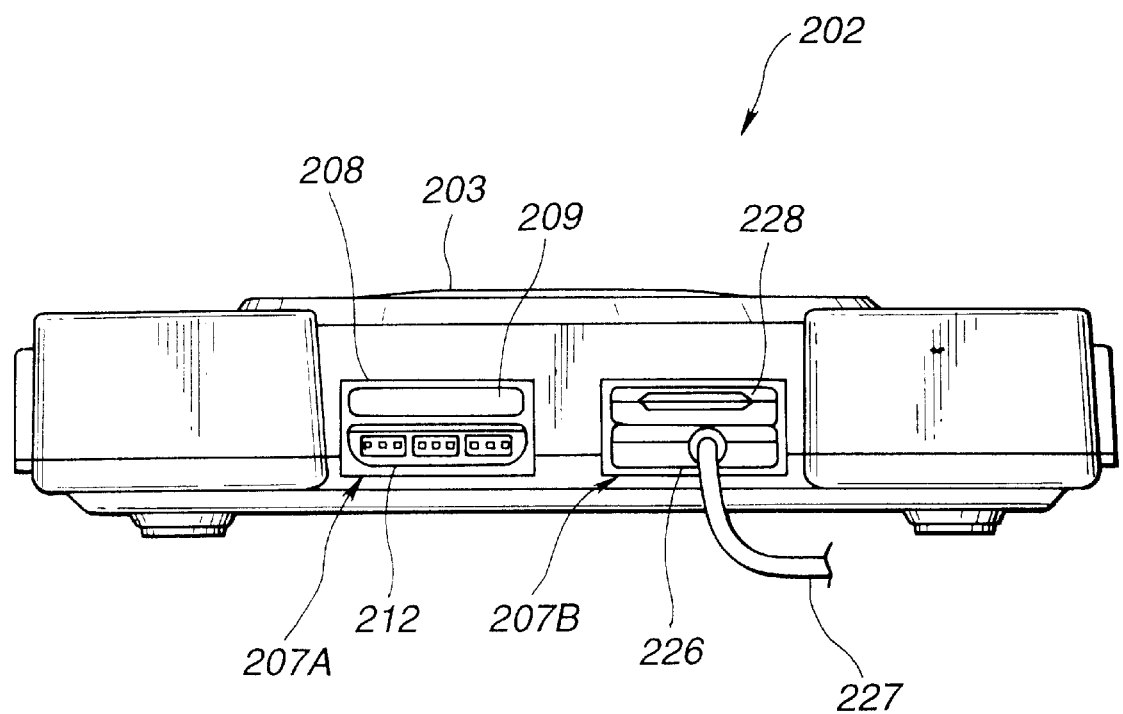
FIG. 16 is a back-side view of the video game machine.
Figure 17:
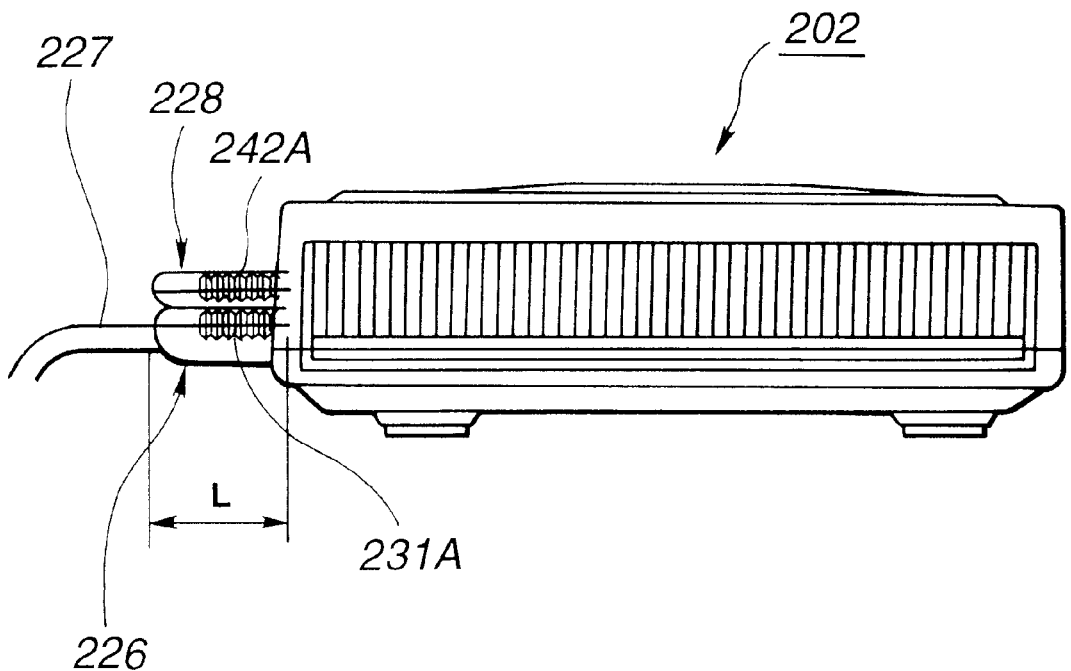
FIG. 17 is a side view of the video game machine.

A video game machine 201, according to the present invention, is configured as shown in a plan view of FIG. 15, a front view of FIG. 16 and in a side view of FIG. 17.

Figure 18:
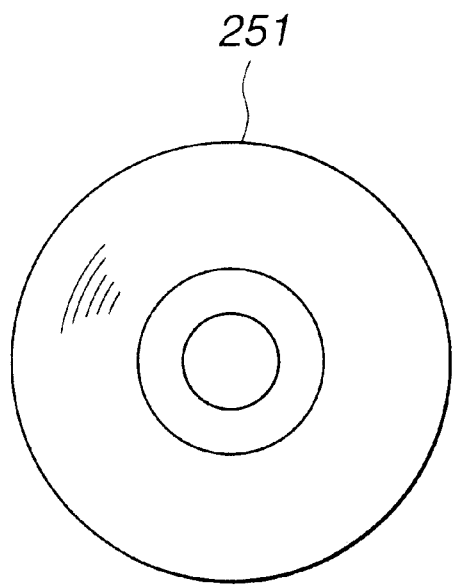
FIG. 18 is a plan view of a CD-ROM loaded on the video game machine.

Specifically, the video game machine 201 is basically made up of a main body member 202 and an operating device 217 connected to the main body member 202 via a cable 227, as shown in FIG. 15. At a mid portion on the upper surface of the main body member 202 is mounted a disc loading unit 203 within which is loaded a CD-ROM 251 shown in FIG. 18. On the left side of the disc loading unit 203 are mounted a power source switch 205 operated for turning on or off the device and a reset switch 204 operated for transiently resetting the game. On the right side of the disc loading unit 203 is mounted a disc actuating switch 206 operated for mounting or dismounting the CD-ROM 251 with respect to the disc loading unit 203.

On the front side of the main body member 202 are mounted connecting portions 207A, 207B, as shown in FIG. 16. These connecting portions 207A, 207B are provided with a connection terminal 226 provided on the foremast part of the cable 227 derived from the operating device 217 and a connection terminal inserting portion 212 for connecting a recording device 228, such as a memory card, and a recording/inserting portion 208. That is, two each of the operating devices 217 and recording devices 228 can be connected to the main body member 202.

The front view of FIG. 16 shows the state in which the connection terminal portion 226 and the recording device 228 are loaded on the right side connecting portion 207B with none of the connecting terminal portion 226 nor the recording device 228 being loaded on the left side connecting portion 207A. The recording inserting portion 208 for loading the recording device 228 thereon is provided with the shutter 209. When loading the recording device 228 on the main body member 202, the shutter 209 is thrust by the foremost part of the recording device 228 to effect loading.

The connecting terminal portion 226 has a knurled gripping part 231A for anti-slip effect. Similarly, the recording device 228 has a knurled gripping part 242A for anti-slip effect. Referring to a side view of FIG. 17, the connecting terminal portion 226 has a length L substantially equal to a length of the recording device 228.

The operating device 27 has supports 220, 221 that can be gripped with left and right hands. The foremost parts of the supports 220, 221 are provided with operating parts 218, 219, respectively. The operating parts 224, 225 are operated with index fingers of both hands, while the operating parts 218, 219 are operated with thumbs of both hands.

Between the operating parts 218 and 219 are provided a select switch 222 that is actuated for selection during the game and a start switch 223 operated for starting the game.

With the present video game machine 201, the CD-ROM 251 loaded on the disc loading unit 203 is reproduced by the CD-ROM driver 30. The operating device 217 is equivalent to the above-mentioned input device 28, while the recording device 228 is equivalent to the auxiliary storage device 27.

The present invention is not limited to the above-described embodiments. For example, the illustrative structure of the operating device is not limited to the configuration as shown and may be of any other desired configuration, the operating device may also be omitted, if so desired.

What is claimed is:

1. A picture generating apparatus comprising:

drawing means for generating pixel data items each including an address and pixel data according to picture information sequentially;

a transient memory for storing the pixel data items generated by the drawing means and for generating pixel data items sequentially from the stored pixel data;

a cache memory;

a frame memory for storing pixel data;

first control means for writing pixel data of the output pixel data items into the cache memory according to addresses thereof; and second control means for reading an address of the pixel data item stored in the transient memory before the pixel data item is output, wherein the second control means retrieves pixel data in the cache memory to detect pixel data whose address has a given part of the same value as that of the read address and which satisfies a given condition, and accesses the frame memory to cache pixel data located at the read address and pixel data located at the address of the detected pixel data, into the cache memory at one time.

2. A picture generating apparatus according to claim 1, wherein the given condition is satisfied when the detected pixel data is invalid so as to make it unnecessary for the detected pixel data to remain in the cache memory.

3. A picture generating apparatus according to claim 1, wherein each of the pixel data items includes an operation instruction, and the first control means performs at least one of Z-buffer processing, anti-aliasing processing, filtering processing, α-blending processing, semi-transparent processing and pixel re-arraying processing to the output pixel data item according to an operation instruction thereof and writes the processed pixel data into the cache memory.

4. A video game machine comprising the picture generating apparatus according to claim 1.

5. A method used in a picture generating apparatus which comprises drawing means for generating pixel data items each including an address and pixel data according to picture information sequentially, a transient memory for storing the pixel data items generated by the drawing means and for outputting the stored pixel data items sequentially, a cache memory and a frame memory for storing pixel data, comprising the steps of:

writing pixel data of the output pixel data items into the cache memory according to the addresses thereof;

reading an address of the pixel data item stored in the transient memory before the pixel data item is output; and retrieving in the cache memory to detect pixel data whose address has a given part of the same value as that of the read address and which satisfies a given condition, and accessing the frame memory to cache pixel data located at the read address and pixel data located at the address of the detected pixel data, into the cache memory at one time.

* * * * *